United States Patent Office 3,579,479
Patented May 18, 1971

3,579,479
3-ENDO-METHYL - 3 - EXO(4' - METHYL - 5'-HYDROXYPENTYL)NORCAMPHOR AND 2-METHYL-5-BROMOPENTANOL, AND PROCESS FOR THE PREPARATION OF THESE COMPOUNDS
Wayne I. Fanta and William F. Erman, Springfield Township, Hamilton County, Ohio, assignors to The Procter & Gamble Company, Cincinnati, Ohio
No Drawing. Filed Mar. 29, 1968, Ser. No. 717,360
Int. Cl. C07c 49/27
U.S. Cl. 260—586        12 Claims

ABSTRACT OF THE DISCLOSURE

The novel compounds, 2-methyl-5-bromopentanol and 3-endo-methyl-3-exo(4' - methyl - 5' - hydroxypentyl) norcamphor and the process for preparing 2-methyl-5-bromopentanol and 3 - endo-methyl-3-exo(4'-methyl-5'-hydroxypentyl)norcamphor from 2 - methyl-4-pentenol comprising the steps of (1) borating 2-methyl-4-pentenol with boric acid and/or boric anhydride to obtain tri(2-methyl-4-pentenyl)borate; (2) hydrobrominating the tri(2-methyl-4-pentenyl)borate in the presence of a free radical catalyst and, subsequently, hydrolyzing the reaction product to obtain 2-methyl-5-bromopentanol; (3) borating the 2-methyl-5-bromopentanol with boric acid and/or boric anhydride to obtain tri(2-methyl-5-bromopentyl)borate; (4) alkylating 3 - methylnorcamphor with the tri(2-methyl-5-bromopentyl)borate and, subsequently, hydrolyzing the reaction product to obtain 3-endo-methyl-3-exo(4'-methyl-5'-hydroxypentyl)norcamphor.

FIELD OF THE INVENTION

This invention relates to two novel compounds, i.e., 3 - endo - methyl - 3 - exo(4'-methyl-5'-hydroxypentyl) norcamphor and 2 - methyl-5-bromopentanol. Both of these compounds are useful intermediates in the synthesis of dihydro-β-santalol; the norcamphor compound also has valuable perfume qualities.

This invention also relates to a process for obtaining 3-endo-methyl - 3 - exo(4' - methyl-5'-hydroxypentyl) norcamphor from 2-methyl-4-pentenol. More specifically, the 2-methyl-4-pentenol, protected as the borate, is hydrobrominated by a free radical, i.e., anti-Markownikoff, addition, and subsequently used in alkylating 3-methylnorcamphor. This product is hydrolyzed to obtain 3-endo-methyl - 3-exo(4' - methyl-5'-hydroxypentyl)norcamphor.

HISTORY OF THE INVENTION

East Indian sandalwood oil has heretofore been available only from East Indian sandalwood trees. This oil and various individual components of the oil are highly valued perfume bases and are used in large quantities throughout the industry. The oil, however, is expensive and is in limited and sometimes sporadic supply. For this reason, a continuous effort has been made to synthesize various components of the oil or similar synthetic materials which possess the desirable, powerful woody fragrance of sandalwood oil.

The novel compounds, 2-methyl-5-bromopentanol and 3-endo-methyl-3 - exo(4' - methyl - 5' - hydroxypentyl) norcamphor, and the process for preparing these compounds represent a portion of an extensive scientific effort to obtain dihydro-β-santalol, a novel compound having a desirable sandalwood fragrance. Other compounds and processes for obtaining these compounds which relate to the synthesis of dihydro-β-santalol, as well as the novel compound, dihydro-β-santalol, are described in the following U.S. patent applications which were filed simultaneously herewith: Fanta and Erman, Tetrahydropyranyl Ether Compounds and Process for the Preparation of These Compounds and 3-Endo-Methyl-3-Exo(4'-Methyl - 5' - Hydroxypentyl)Norcamphor, Ser. No. 717,384, filed Mar. 29, 1968; Fanta and Erman, Preparation of 3-Endo-Methyl-3-Exo(4'-Methyl-5'-Hydroxypentyl)Norcamphor From 2-Methyl-4-Pentenol, Ser. No. 717,374, filed Mar. 29, 1968; Fanta and Erman, Preparation of 3 - Endo-Methyl-3-Exo(4'-Methyl-5'-Hydroxypentyl(Norcamphor From 2-Methyl-4-Pentenol, Ser. No. 717,362, filed Mar. 29, 1968; Fanta and Erman, Dihydro-β-Santalol and Process for Preparing Dihydro-β-Santalol from 3-Endo-Methyl-3-Exo(4' - Methyl-5'-Hydroxypentyl)Norcamphor, Ser. No. 717,458, filed Mar. 29, 1968.

SUMMARY OF THE INVENTION

The process of this invention comprises the steps of:
(1) Borating 2-methyl-4-pentenol having the general formula

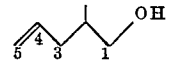

with a compound selected from the group consisting of boric acid, boric anhydride and mixtures thereof to obtain tri(2-methyl-4-pentenyl)borate having the general formula

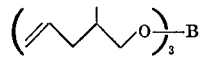

(2) Hydrobrominating the tri(2 - methyl-4-pentenyl) borate with hydrogen bromide in the presence of a free radical catalyst to form tri(2 - methyl-5-bromopentyl) borate and subsequently hydrolyzing tri(2-methyl-5-bromopentyl)borate to obtain 2-methyl-5-bromopentanol having the general formula

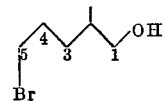

(3) Borating the 2 - methyl-5-bromopentanol with a compound selected from the group consisting of boric acid, boric anhydride and mixtures thereof to obtain tri (2 - methyl-5 - bromopentyl)borate having the general formula

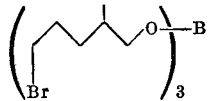

(4) Reacting tri(2-methyl-5-bromopentyl)borate with a mixture prepared from 3-methylnorcamphor having the general formula

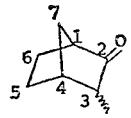

and a strong base and subsequently hydrolyzing the reaction product thereof to obtain 3-endo-methyl-3-exo(4'-methyl-5'-hydroxypentyl)norcamphor having the general formula

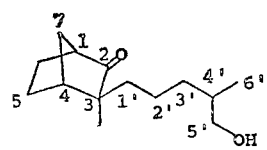

The novel compounds, 2-methyl-5-bromopentanol and 3-endo-methyl-3-exo(4′-methyl - 5′ - hydroxypentyl)norcamphor, are also an integral part of this invention. These compounds have specific utility as intermediates in the synthesis of the novel compound, dihydro - β - santalol. 3-endo-methyl-3-exo(4′-methyl - 5′ - hydroxypentyl)norcamphor also has utility as a valuable perfume compound.

DESCRIPTION OF THE PRODUCTS AND PROCESS

The initial starting compound for this process, 2-methyl-4-pentenol, is known and can be obtained by several different methods. One method comprises reacting diethyl malonate with methyl bromide in the presence of a base to obtain diethyl methylmalonate. Diethyl methylmalonate is reacted with allyl chloride in a base catalyzed alkylation reaction to obtain diethyl methylallylmalonate. This compound is saponified with a base to obtain the salt, and then the salt is reacted with an acid to obtain the dicarboxylic acid. Heat is applied to the dicarboxylic acid at reduced pressures to obtain the monocarboxylic acid which is subsequently reduced to 2-methyl-4-pentenol with lithium aluminum hydride. This synthesis is generally described in Allen et al., 2-Methylenedodecanoic Acid, Organic Syntheses, 38, pp. 47–51 (1958), and Fray et al., Constituents of the Lipids of Tubercle Bacilli. Part VII. Synthesis of (+)−2(L): 4-Dimethyldocosanoic Acid, an Oxidation Product of Mycolipenic Acid, Journal of the Chemical Society, pp. 2036–41 (1956).

A second method of obtaining 2-methyl-4-pentenol is set forth in Cherest et al., Addition of Grignard Reagents to the Double Bond of Allylic Alcohols, Tetrahedron Letters, No. 8, pp. 875–879 (1966). This reference discloses reacting 2.5 moles of allyl magnesium bromide with 1 mole of allyl alcohol to obtain 2-methyl-4-pentenol.

Another novel and less expensive method of obtaining 2-methyl-4-pentenol comprises the steps of reacting 1 mole of allyl alcohol with from about 0.9 to about 1.2 moles of methyl magnesium bromide and subsequently reacting this reaction product with from about 1 to about 1.5 moles of allyl magnesium bromide to obtain 2-methyl-4-pentenol. Preferably, this reaction is run in diethyl ether solvent in an inert atmosphere, e.g., nitrogen or argon. In this process, methyl magnesium bromide is added slowly with agitation to the allyl alcohol. The temperature of this reaction is preferably maintained at ordinary room temperature or below, i.e., from about 5° C. to about 35° C. The reaction mixture is subsequently reacted with allyl magnesium bromide at temperatures ranging from about 20° C. to about 50° C., generally at reflux, for from about 30 to about 80 hours to obtain 2-methyl-4-pentenol. The same product is isolated in lesser yield using methyl magnesium bromide and allyl magnesium bromide in tetrahydrofuran solvent; methyl magnesium bromide and allyl magnesium chloride in diethyl ether solvent; methyl magnesium bromide and allyl magnesium chloride in diethyl ether/tetrahydrofuran solvent mixtures; methyl magnesium chloride and allyl magnesium chloride in tetrahydrofuran; and methyl magnesium bromide and allyl magnesium bromide in dibutyl ether solvent.

The first step of the process of this invention comprises borating 2-methyl-4-pentenol, a colorless liquid having the general formula

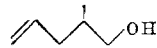

with a compound selected from the group consisting of boric acid, boric anhydride or mixtures thereof to obtain tri(2-methyl - 4 - pentenyl)borate having the general formula

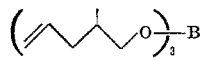

The hydroxyl functional group of the 2-methyl-4-pentenol is thereby protected in the subsequent hydrobromination reaction. Without protection of the hydroxyl group, the subsequent hydrobromination proceeds in poor yield.

A reaction mixture comprising 2-methyl-4-pentenol, boric acid and/or boric anhydride and a solvent which forms an azeotrope with water is prepared. The boric acid and/or boric anhydride is preferably used in this reaction mixture in a molar ratio of 2-methyl-4-pentenol to boric acid of about 3:1 and 2-methyl-4-pentenol to boric anhydride of about 6:1. Boric acid and/or boric anhydride can be used herein in amounts more than or less than the amounts above specified. However, if excess boric acid and/or boric anhydride is utilized in the reaction, it must be removed from the reaction mixture in an additional purifying step. If less than the amount specified is utilized herein, a portion of the 2-methyl-4-pentenol will not be protected in the subsequent step of this process.

The solvent used herein forms an azeotrope with water and, preferably, is less dense than water. Typical examples of solvents meeting this definition are benzene, toluene and xylene. Benzene and toluene are the preferred solvents for use herein. Generally, the solvent comprises from about 20% to about 99% of the reaction mixture.

The reaction mixture comprising 2-methyl-4-pentenol, boric acid and/or boric anhydride and the azeotropic solvent is allowed to react at elevated temperatures ranging from about 30° C. to abtout 150° C., e.g., generally at solvent reflux temperatures. As the boric acid and/or boric anhydride reacts with the 2-methyl-4-pentenol, water is formed. When the theoretical amount of water obtainable from the reaction of 2-methyl-4-pentenol and boric acid and/or boric anhydride is formed, heating is discontinued. The resulting mixture contains tri(2-methyl-4-pentenyl) borate and the solvent. The solvent can then be removed by any convenient method, e.g., by distillation, preferably, at reduced pressure. Solvent removal is not necessary, however, as the hydrobromination reaction can be conducted directly in the azeotropic solvent preferably benzene or toluene.

It is preferable in the above described step to use apparatus similar to the Dean-Stark water trap in order to facilitate removal and measurement of the water formed during the reaction. For examples and methods of utilizing this apparatus, see Wiberg, "Laboratory Techniques in Organic Chemistry," pp. 214–217, McGraw-Hill Book Company, Inc., New York (1960), and Dean et al., "A Convenient Method for the Determination of Water in Petroleum and Other Organic Emulsions," The Journal of Industrial and Engineering Chemistry, 12, pp. 486–490 (May 1920).

The second step of this process comprises hydrobrominating the tri(2-methyl-4-pentenyl)borate with hydrogen bromide, preferably in gaseous form, in the presence of a catalytic amount of a free radical catalyst to form tri(2-methyl-5-bromopentyl)borate and subsequently hydrolyzing the tri(2-methyl-5-bromopentyl)borate to obtain 2-methyl-5-bromopentanol having the general formula

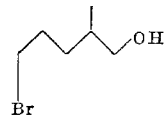

Although a solvent is not required in the hydrobromination of (tri(2-methyl-4-pentenyl)borate, an aprotic solvent, i.e., a solvent which contains no readily available acid protons, is generally and preferably utilized in this step. Among the aprotic solvents suitable for use herein are hexane, pentane, cyclohexane, methylene chloride, diethyl ether, carbon tetrachloride, benzene, toluene, and xylene. The aprotic solvent generally comprises from about 20% to about 99% by weight of the reaction mixture of Step 2.

Free radical catalysts suitable for use in this step are well known and are discussed in Sosnovsky, "Free Radical Reactions in Preparative Organic Chemistry," pp. 6–11, Macmillan, New York (1964). This discussion is incorporated herein by reference. These catalysts include peroxides, ozonides, thermally labile azo compounds, haloketones, and ketones and tetraethyl lead in the presence of ultraviolet light.

Hydrogen bromide is bubbled through the reaction mixture comprising tri(2 - methyl - 4 - pentenyl)borate, the aprotic solvent and the free radical catalyst. Although only 3 moles of hydrogen bromide are theoretically required to react with 1 mole of tri(2-methyl-4-pentenyl) borate to form tri(2-methyl-5-bromopentyl)borate, the hydrogen bromide is generally introduced in large excess, e.g., 3 to 30 moles of hydrogen bromide per mole of the borate. The excess hydrogen bromide can be recycled through the reaction mixture. It is preferred that the hydrobromination reaction be run at low temperatures, i.e., from about −30° C. to about 45° C., preferably from about −10° C. to about 20° C. The low temperatures facilitate free radical, anti-Markownikoff, addition, i.e., formation of primary bromides, and impede ionic addition, i.e., formation of secondary bromides.

The reaction mixture obtained is washed with water or a water solution of a salt, for example, sodium bicarbonate, sodium carbonate, or sodium chloride. The reaction mixture is washed, preferably with an aqueous base solution, to remove the free radical catalyst and any hydrogen bromide in the reaction mixture. These components, the free radical catalyst and the hydrogen bromide, if not removed, may cause competing side reactions with concomitant formation of unwanted secondary reaction products. The water hydrolyzes the borate linkage and thus forms the novel compound, 2-methyl-5-bromopentanol. On standing, this mixture separates into two layers, a water layer and a layer comprised of 2-methyl-5-bromopentanol and the aprotic solvent. The water layer is removed from the reaction mixture and any water remaining in the reaction mixture is removed by any of the well known drying methods. For example, an inorganic drying agent such as magnesium sulfate can be used in this step.

The aprotic solvent can subsequently be removed from the reaction mixture, for example, by distillation, preferably, under reduced pressure. Benzene and toluene solvents need not be removed as the following reaction is preferably run in one of these solvents. The product obtained is 2-methyl-5-bromopentanol, a viscous, colorless oil, which finds specific utility as an intermediate in synthesizing dihydro-β-santalol as described hereinbefore.

In the third step of this process, the 2-methyl-5-bromopentanol is borated with boric acid and/or boric anhydride in a suitable solvent. The reaction conditions, solvents, molar ratios of components and general workup in Step 1 and in this step, Step 3, are the same and, therefore, are not discussed again herein.

The reaction mixture comprising 2-methyl-5-bromopentanol, boric acid and/or boric anhydride, and solvent is maintained at temperatures ranging from about 30° C. to about 150° C. Generally the reaction mixture is refluxed at the solvent reflux temperature, preferably in a reaction flask equipped with a Dean-Stark water trap, until the theoretical amount of water from the reaction of 2-methyl-5-bromopentanol and boric acid and/or boric anhydride is obtained. At this point, heating is discontinued, the reaction mixture is cooled, and the solvent can be removed from the reaction mixture, preferably by distillation under reduced pressure, to obtain an extremely viscous oil, tri(2-methyl-5-bromopentyl)borate. Solvents such as benzene or toluene need not be removed as these solvents are useful in the next step of this process.

In the fourth step of this reaction, the tri(2-methyl-5-bromopentyl)borate is reacted with a mixture prepared from 3-methylnorcamphor, a strong base and a solvent and, subsequently, the reaction product thereof is hydrolyzed to obtain 3-endo-methyl - 3 - exo(4'methyl - 5'-hydroxypentyl)norcamphor having the following general formula

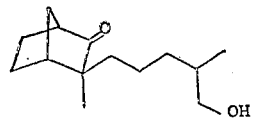

Processes for preparing 3-methylnorcamphor are described in Corey et al., The Synthesis of d,l-β-Santalene and d,l-Epi-β-Santalene by Stereospecific Route, J. Am. Chem. Soc., 84, p. 2611 (1962). The endo or the exo isomers of 3-methylnorcamphor or mixtures of these isomers can be used herein.

Suitable strong bases and suitable solvents for use with 3-methylnorcamphor are described in House, "Modern Synthetic Reactions," p. 185, Benjamin, New York (1965). In this portion of this step, the base-solvent system should possess a relative basicity of $pK_a$ equal to or greater than the $pK_a$ of hydroxyl ion in aprotic solvents. It is preferred that the $pK_a$ of the base-solvent system be greater than the $pK_a$ of hydroxyl ion in aprotic solvents. The strong bases suitable for use herein include potassium-t-butoxide, sodium-t-amylate, sodium amide, potassium amide, sodium hydride, lithium hydride, dimethyl sulfoxide anion, sodium or potassium or lithium triphenyl methide and sodium naphthalenide. Solvents commonly used with these strong bases include benzene, toluene, xylene, tetrahydrofuran, and diethyl ether. Strong bases preferred for use herein are sodium amide and sodium hydride; preferred solvents are benzene, toluene, xylene and tetrahydrofuran.

The mixture of 3-methylnorcamphor, strong base and solvent should contain 3-methylnorcamphor and strong base in a molar ratio of about 1:1. An excess of either component can be used; however, that excess does not aid the reaction and adds to the total cost. Therefore, excess amounts of these components are generally not used. The amount of solvent used in this mixture is not critical. Generally, the solvent comprises from about 75% to about 95% by weight of the mixture.

This mixture is then heated to form the enolate of 3-methylnorcamphor which has the following general formula (sodium is utilized as a representative cation).

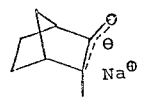

Formation of the enolate generally requires heating of the mixture at temperatures ranging from 50° C. to 130° C. for from about 1 to about 8 hours during which time hydrogen gas is evolved from the reaction mixture. When the theoretical amount of hydrogen gas is evolved, the formation of the enolate is completed. The time required for forming the enolate varies as enolate formation is, of course, dependent upon concentration of the components, amount of solvent utilized, and the intensity of the heat source.

This mixture containing the enolate of 3-methylnorcamphor and the solvent is then treated with the tri(2-methyl-5-bromopentyl)borate obtained from Step 3 in a molar ratio of the enolate of 3-methylnorcamphor (i.e., 3-methylnorcamphor originally in the mixture) to tri(2-methyl-5-bromopentyl)borate of about 3:1. Again, excess amounts of either component can be used in this reaction, however, the excess amount does not enter into the reaction and must be removed from the final product or tolerated as an impurity.

The reaction mixture containing the enolate and the borate is maintained at elevated temperatures ranging from about 50° C. to about 150° C., usually at the reflux temperature of the solvent being utilized, for from about 24 to about 120 hours to obtain a methylnorcamphor alkyl borate compound. In order to hydrolyze the borate linkage and obtain 3-endo-methyl - 3 - exo(4' - methyl-5'-hydroxypentyl)norcamphor, the reaction mixture is cooled and water is added with agitation to the reaction mixture. Agitation of the mixture is continued, generally for from about 10 to about 60 minutes. On standing, the water layer separates from the reaction mixture; the water layer is then removed. To obtain maximum yields of 3-endo-methyl-3 - exo(4' - methyl - 5' - hydroxypentyl)norcamphor the water can be extracted with ether and the ether extract added to the solvent mixture. The reaction mixture is dried by ordinary methods, e.g., an inorganic drying compound such as magnesium sulfate, and then the solvent is removed, e.g., by distillation, preferably, at reduced pressures. The final product is 3-endo-methyl-3-exo(4'-methyl-5'-hydroxypentyl)norcamphor, a colorless, viscous oil.

The novel compound, 3-endo-methyl-3-exo(4'-methyl-5'-hydroxypentyl)norcamphor, prepared by the process of this invention, has a highly desirable and useful odor characterized as a sweet, fruity (strawberry, pineapple, melon, berry, apple), floral note. This compound can be used individually as an odorant per se or this compound can be used as a component of perfume compositions for ultimate use in products such as soaps, detergents, deodorants, food products and the like. Perfume compositions containing odoriferously effective amounts, e.g. 0.0001% to about 50% but preferably from 0.01% to 20%, of 3-endo-methyl-3-exo(4'-methyl - 5' - hydroxypentyl)norcamphor are desirable and useful. More specific illustrations of the perfume utility of this compound are found in Examples II to IV hereinafter.

EXAMPLES

The following examples illustrate specific preferred embodiments of this invention and are not intended to be limiting. All percentages and ratios in the following examples as well as in the specification and in the appended claims are by weight unless otherwise indicated. Temperatures are expressed in degrees centigrade.

Data listed in all of the examples were obtained by means of the following techniques unless otherwise indicated. The apparatus described by Johnson et al., "β-Carbethoxy - γ,γ - Diphenylvinylacetic Acid," Organic Syntheses, 30, p. 18 (1950), was used to maintain a nitrogen atmosphere. Infrared spectra were determined on a Perkin-Elmer Model 137 spectrophotometer; ultraviolet spectra were determined in ethanol on a Perkin Elmer Model 202 spectrophotometer. Nuclear magnetic resonance (N.M.R.) spectra were determined in carbon tetrachloride with a Varian Model HA–100 spectrometer with chemical shifts measured relative to tetramethylsilane (10 $\tau$). The N.M.R. data are noted by chemical shift, integration, multiplicity, coupling constant (in Hz.), and assignment. Gas-liquid chromatography was accomplished with an Aerograph Model 202B using a flow rate of 100 ml./min. on 5-ft. by 0.25-in. columns packed with (A) 20% FFAP (Carbowax 20M terminated with nitroterephthalic acid) on 60/80 Chromosorb P or (B) 20% SE 30 (a methyl silicone gum rubber compound) on 60/80 Chromosorb W.

EXAMPLE I

Preparation of 3-endo-methyl-3-exo(4'-methyl-5'-hydroxypentyl)norcamphor from allyl alcohol (A) Preparation of 2-methyl-4-pentenol from allyl alcohol.—Apparatus consisting of a 1-l. flask fitted with an addition funnel, mechanical stirrer and reflux condenser was flame dried under vacuum and a nitrogen atomsphere was introduced. A solution of 23.2 g. (0.4 mole) of allyl alcohol in 60 ml. of anhydrous diethyl ether was introduced into the apparatus; 150 ml. of 3 M methyl magnesium bromide (0.45 mole) in diethyl ether was added at a rate which maintained gentle reflux (ca. 4 hr.). The solid formed during the early stages of methyl magnesium bromide addition gradually dissolved to afford a clear brown solution. This solution was reacted with 360 ml. of 1.4 M ethereal allyl magnesium bromide (0.5 mole) and the resulting reaction mixture was stirred rapidly at reflux for 50 hrs. The resulting mixture was added slowly to ice and solution was effected by cautious addition of a minor amount of 10% aqueous hydrochloric acid. The solution was saturated with salt and the product, 2-methyl-4-pentenol, isolated with ether. Combined extracts were washed with brine and dried over magnesium sulfate. Removal of the solvent and subsequent distillation afforded 25.4 g. (64%) of 2-methyl-4-pentenol, B.P. 53–58° (13 mm.) which showed 96% purity by gas-liquid partition chromatography. Material purified by redistillation, B.P. 57–59° (13 mm.) and gas chromatography exhibited $n_D^{21.5}$ 1.4319, $\lambda_{max.}^{film}$ 3.00, 3.28, 6.10, 9.68, 10.04, 10.91$\mu$ N.M.R. signals at $\tau$ 4.00–4.51 (1H, —CH=), 4.90–5.20 (2H, CH=CH$_2$), 5.60 (1H, OH), 6.40–6.80 (2H, CH$_2$OH), 9.10 (3H, doublet, J=7 Hz., CHCH$_3$). Reported for 2-methyl-4-pentenol $n_D^{18}$ 1.4345.

*Analysis.*—Calculated for C$_6$H$_{12}$O (percent): C, 71.95; H, 12.08. Found (percent): C, 72.12; H, 12.18.

Results substantially similar to those obtained in paragraph A are obtained when the following Grignard reagent-solvent systems are substituted for methyl magnesium bromide, allyl magnesium bromide, diethyl ether system used above: methyl magnesium bromide, allyl magnesium bromide, tetrahydrofuran; methyl magnesium bromide, allyl magnesium chloride, diethyl ether; methyl magnesium bromide, allyl magnesium chloride, a mixture comprising 50% diethyl ether and 50% tetrahydrofuran; methyl magnesium chloride, allyl magnesium chloride, tetrahydrofuran; methyl magnesium bromide, allyl magnesium bromide, dibutyl ether solvent.

(B) Preparation of tri(2 - methyl - 4-pentenyl)borate 2-methyl-4-pentenol.—A 500 ml. flask fitted with a Dean-Stark trap and condenser was charged with a solution of 25 g. (0.25 mole) of 2-methyl-4-pentenol in 250 ml. of benzene and 5.25 g. (0.083 mole) of boric acid. The reaction mixture was refluxed under nitrogen until the theoretical amount of H$_2$O had collected. The solution was cooled slightly and the solvent was removed at reduced pressure to afford 27.2 g. (100%) of colorless oil, $\lambda_{max.}^{film}$ 3.30, 6.11, 6.78, 7.08, 7.51, 9.61, 10.06, 10.94

N.M.R. signals at $\tau$ 3.95–4.40 (1H, —CH=), 4.85–5.15 (2H, CH=CH$_2$), 6.25 (2H, doublet, J=6 Hz., CH$_2$O—) 9.11 (3H, doublet, J=7 Hz., CHCH$_3$). This material was used directly without further purification.

Results substantially similar to those achieved in paragraph B are obtained when 0.042 mole of boric anhydride are substituted for the 0.083 mole of boric acid in that the hydroxyl groups of the 2-methyl-4-pentenol are protected in the subsequent step. Substantially similar results are also obtained when toluene and xylene are substituted for benzene on an equal weight basis.

(C) Preparation of 2-methyl-5-bromopentanol from tri(2-methyl-4-pentenyl)borate.—A dry 500 ml. flask fitted with a subsurface gas inlet and reflux condenser was charged with a solution of ca. 0.25 mole of crude tri(2-methyl-5-pentenyl)borate in 250 ml. of hexane and 500 mg. of benzoyl peroxide. The mixture was cooled to 0° C. and excess anhydrous hydrogen bromide, ca. 2.5 moles, was passed in rapidly during a 50 minute period. The reaction mixture was stirred for an additional 1 hour and the excess gas was removed by a nitrogen sweep. The reaction product was hydrolyzed and the benzoyl peroxide and hydrogen bromide were removed with a saturated aqueous solution of sodium bicarbonate followed by a brine wash. The solution was dried with magnesium sulfate and the hexane was removed by distillation to afford 41.52 g. of novel compound, 2-methyl-5-bromopentanol. This material can be used directly in the next step of this process. However, it was further purified by distillation to afford 36.8 g. (86%) of clear 2-methyl-5-bromopentanol, B.P. 70° (0.1 mm.). This material on redistillation, B.P. 62° (0.02 mm.) gave an oil exhibiting $n_D^{25}$ 1.4829, $$\lambda_{max}^{film}\ 2.99,\ 8.10,\ 9.68\mu$$

N.M.R. signals at $\tau$ 4.30 (1H, OH), 6.59 (2H, doublet, J=7 Hz., CH$_2$OH'), 6.61 (2H, triplet, J=6.5 Hz., CH$_2$Br), 9.05 (3H, doublet, J=6 Hz. (CHCH$_3$).

Analysis.—Calculated for C$_6$H$_{13}$BrO (percent): C, 39.79; H, 7.23; Br, 44.14. Found (percent): C, 39.90; H, 7.23; Br, 44.07.

Results substantially similar to those achieved in paragraph C are obtained when the following solvents are substituted for hexane on an equal weight basis; pentane, cyclohexane, methylene chloride, diethyl ether, carbon tetrachloride, benzene, toluene, and xylene. Substantially similar results are also obtained when the following free radical catalysts are substituted for benzoyl peroxide: ozone, oxygen, t-butyl peroxide, acetyl peroxide, ascaridole, azotriphenylmethane, bromoacetone, and compounds such as acetone and tetraethyl lead in the presence of ultraviolet light.

(D) Preparation of tri(2-methyl-5-bromopentyl)borate from 2-methyl-5-bromopentanol.—The procedure utilized herein was the same as that employed in paragraph B above. From 18 g. (0.1 mole) of crude 2-methyl-5-bromopentanol in about 200 ml. of benzene and 2.10 g. (ca. 0.033 mole) of boric acid, there was obtained after azeotropic removal of water and solvent removal, 18.82 g. of crude tri(2-methyl-5-bromopentyl)borate. The product had the following characteristics:

$$\lambda_{max}^{film}\ 6.75,\ 7.05,\ 7.48,\ 9.68\mu$$

N.M.R. signals at $\tau$ 6.38 (2H, doublet, J=6 Hz., CH$_2$OH), 6.63 (2H, triplet, J=7 Hz., CH$_2$Br), 9.10 (3H, doublet, J=7 Hz., CHCH$_3$). This material was used directly without further purification.

Results substantially similar to those achieved in paragraph D are obtained when 0.0167 mole of boric anhydride are substituted for the 0.033 mole of boric acid in that the hydroxyl groups of the 2-methyl-5-bromopentanol are protected the subsequent step of this process. Substantially similar results are also obtained when toluene and xylene are substituted for benzene on an equal weight basis.

(E) Preparation of 3-endo-methyl-3-exo(4'-methyl-5'-hydroxypentyl)norcamphor from tri(2-methyl-5-bromopentyl)borate.—A 500 ml. flask fitted with a condenser and addition funnel was charged with 4.9 g. (0.125 mole) of a 61% mineral oil dispersion of sodium hydride. A nitrogen atmosphere was introduced along with 60 ml. of toluene (redistilled). A solution of 12.4 g. (0.1 mole) of 3-methylnorcamphor in 60 ml. of dry toluene was added and enolate formation proceeded over 2.25 hr. at 130°. The refluxing enolate mixture was treated as rapidly as possible with a solution of 18.82 g. (ca. 0.034 mole) of crude tri(2-methyl-5-bromopentyl)borate in 60 ml. of dry toluene. The reaction mixture was stirred rapidly at reflux for an additional 68 hrs., cooled, and added to brine. The reaction product was isolated with ether and the combined extracts were washed with brine and dried over magnesium sulfate. Solvent removal afforded a crude oil which on distillation gave 13.87 g. (62%) of 3-endo-methyl - 3 - exo(4'-methyl-5'-hydroxypentyl)norcamphor, B.P. 117–130° (0.08 mm.) which showed 90% purity by gas-liquid partition chromatography. This material after redistillation, had the following characteristics: B.P. 127–130° (0.07 mm.), and gas-liquid partition chromatography gave 3 - endomethyl - 3 - exo(4'-methyl-5'-hydroxypentyl)norcamphor exhibiting $$\lambda_{max}^{film}\ 2.90,\ 5.73,\ 7.30,\ 9.60,\ 10.92,\ 13.02\mu$$

N.M.R. signals at $\tau$ 6.68 (2H, doublet, J=6 Hz., CH$_2$OH), 7.01 (1H, OH), 7.51, 7.65 (2H, C$_1$—H, C$_4$—H), 9.01 (3H, CH$_3$), 9.08 (3H, doublet, J=6.5 Hz., CHCH$_3$).

Analysis.—Calculated for C$_{14}$H$_{24}$O$_2$ (percent): C, 74.95; H, 10.78. Found (percent): C, 74.81; H, 10.83.

Results substantially similar to those achieved in paragraph E are obtained when the following strong bases are substituted for sodium hydride: potassium-t-butoxide, sodium-t-amylate, sodium amide, potassium amide, lithium hydride, dimethyl sulfoxide anion, sodium triphenyl methide and sodium naphthalenide. Substantially similar results are also obtained when the following solvents are substituted for toluene: benzene, xylene, and tetrahydrofuran.

The 3 - endo-methyl-3-exo(4'-methyl-5'-hydroxypentyl) norcamphor isolated in paragraph E above, was a colorless viscous oil having an odor characterized as a sweet, fruity (strawberry, pineapple, melon, berry, apple) floral note. This odor characteristic is useful in a wide variety of perfume compositions.

EXAMPLE II

Perfume compositions

Perfume compositions containing 3-endo-methyl-3-exo-(4'-methyl-5'-hydroxypentyl)norcamphor are prepared by intermixing the components shown below. The compositions exhibit highly desirable and useful odors.

COMPOSITION A.—STRAWBERRY BASE

| Components: | Percent by weight |
|---|---|
| 3-endo-methyl - 3 - exo(4'-methyl - 5' - hydroxypentyl)norcamphor | 10 |
| Ethyl acetate | 30 |
| Ethyl benzoate | 3 |
| Ethyl butyrate | 20 |
| Ethyl nitrate | 10 |
| Ethyl pelargonate | 5 |
| Ethyl formate | 10 |
| Amyl acetate | 4 |
| Benzyl acetone | 3 |
| Methyl naphthyl ketone | 1 |
| Methyl salicylate | 2 |
| Cinnamon oil | 1 |
| Coumarin | 1 |
| | 100 |

COMPOSITION B.—PINEAPPLE BASE

| Components: | Percent by weight |
|---|---|
| Amyl butyrate | 50 |
| Ethyl butyrate | 20 |
| Ethyl acetate | 5 |
| Acetaldehyde | 6 |
| Chloroform | 5 |
| Lemon oil | 2 |
| 3 - endo - methyl - 3-exo(4'-methyl-5'-hydroxypentyl)norcamphor | 1 |
| Propyl valerinate | 10 |
| Vanillin | 1 |
| | 100 |

The components and proportions in the perfume compositions of this example can be adjusted according to methods well known in the perfume art to form a wide variety of desirable perfume compositions containing odoriferously effective amounts of these compounds.

EXAMPLE III

Soap bar composition

A conventional household soap bar having the following composition is prepared.

| Component: | Percent by weight |
|---|---|
| Sodium soap | 75.0 |
| Potassium soap (the total soap comprises a mixture of 80% tallow soap and 20% coconut soap) | 7.5 |
| Water | 15.0 |
| Perfume Composition A of Example II | 2.5 |
| | 100.0 |

This soap bar exhibits a desirable strawberry fragrance. Composition B can be substituted for Composition A in the above soap bar composition to attain a pineapple fragrance.

EXAMPLE IV

Liquid detergent composition

| Component: | Percent by weight |
|---|---|
| Ammonium salt of the sulfated condensation product of 1 mole of middle-cut coconut alcohol having the following alkyl chain length distribution—2% $C_{10}$; 66% $C_{12}$; 23% $C_{14}$; 9% $C_{16}$—with 3 moles of ethylene oxide | 25.0 |
| Middle-cut coconut alkyl (see above for chain length distribution) dimethyl amine oxide | 5.0 |
| Sodium middle-cut alkyl (see above for chain length distribution glycerol ether sulfonate | 4.0 |
| Ethyl alcohol | 12.0 |
| Perfume Composition A of Example II | 0.2 |
| Water | 53.8 |
| | 100.0 |

The liquid detergent composition exhibits a desirable strawberry fragrance. Composition B can be substituted for Composition A in the above liquid detergent composition to attain a pineapple fragrance.

What is claimed is:

1. 3-endo-methyl-3-exo(4'-methyl-5'-hydroxypentyl)norcamphor having the general formula

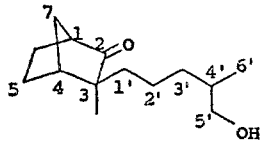

2. A process for preparing 3-endo-methyl-3-exo(4'-methyl-5'-hydroxypentyl)norcamphor comprising the steps of:

(1) borating 2-methyl-4-pentenol at a temperature of about 30° C. to about 150° C. with a compound selected from the group consisting of boric acid in a ratio of 2-methyl-4-pentenol to boric acid of about 3:1 or less, boric anhydride in a ratio of 2-methyl-4-pentenol to boric anhydride of about 6:1 or less, and mixtures thereof to obtain tri(2-methyl-4-pentenyl)borate, (2) hydrobrominating the tri(2-methyl-4-pentenyl)borate with hydrogen bromide at a molar ratio of hydrogen bromide to tri(2-methyl-4-pentenyl)borate of from about 3:1 to about 30:1 at a temperature of from about −30° C. to about 45° C. and in the presence of a catalytic amount of a free radical catalyst which is not irreversibly reactive to said borate nor hydrogen bromide, said catalyst being selected from the group consisting of peroxides, ozonides, thermally labile azo compounds, haloketones, and ketones and tetraethyl lead in the presence of ultraviolet light, to form tri(2-methyl-5-bromopentyl)borate and subsequently washing the reaction mixture, thereby hydrolyzing the tri(2-methyl-5-bromopentyl)borate to obtain 2-methyl-5-bromopentanol, (3) borating the 2-methyl-5-bromopentanol at a temperature of about 30° C. to about 150° C. with a compound selected from the group consisting of boric acid in a ratio of 2-methyl-5-bromopentanol to boric acid of about 3:1 or less, boric anhydride in a ratio of 2-methyl-5-bromopentanol to boric anhydride of about 6:1 or less, and mixtures thereof to obtain tri(2-methyl-5-bromopentyl)borate, (4) preparing a mixture of 3-methylnorcamphor, a strong base selected from the group consisting of potassium-t-butoxide, sodium-t-amylate, sodium amide, potassium amide, sodium hydride, lithium hydride, sodium triphenyl methide, potassium triphenyl methide, lithium triphenyl methide and sodium naphthalenide, and an aprotic solvent which is not reactive with said base nor said norcamphor, and heating said mixture to a temperature of from about 50° C. to about 130° C. for from about 1 hour to about 8 hours to form the enolate of 3-methyl norcamphor, and (5) reacting the mixture from step 4, containing the enolate of 3-methylnorcamphor, with tri(2-methyl-5-bromopentyl)borate at a temperature of from about 50° C. to about 150° C. for about 24 hours to 120 hours and subsequently hydrolyzing the reaction product thereof to obtain 3-endo-methyl-3-exo(4'-methyl-5'-hydroxypentyl)norcamphor having the formula

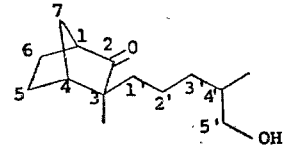

3. The process of claim 2 wherein the 2-methyl-4-pentenol of step 1 is obtained by reacting 1 mole of allyl alcohol with from about 0.9 to about 1.2 moles of methyl Grignard reagent at a temperature ranging from about 5° C. to about 35° C. and, subsequently, reacting this reaction product with from about 1 to about 1.5 moles of allyl Grignard reagent at temperatures ranging from about 20° C. to about 50° C. for from about 30 to about 80 hours.

4. The process of claim 2 wherein a solvent which forms an azeotrope with water is utilized in step 1 and step 3 and wherein the azeotropic solvent comprises from about 20% to about 99% by weight of the reaction mixture.

5. The process of claim 4 wherein the azeotropic solvent is selected from the group consisting of benzene, toluene and xylene.

6. The process of claim 5 wherein in step 1 boric acid is utilized in a molar ratio of 2-methyl-4-pentenol to boric acid of about 3:1 and wherein step 3 boric acid is utilized in a molar ratio of 2-methyl-5-bromopentanol to boric acid of about 3:1.

7. The process of claim 5 wherein in step 1 boric anhydride is utilized in a molar ratio of 2-methyl-4-pentenol to boric anhydride of about 6:1 and wherein in step 3 boric anhydride is utilized in a molar ratio of 2-methyl-5-bromopentanol to boric anhydride of about 6:1.

8. The process of claim 5 wherein an aprotic solvent comprises from about 20% to about 99% of the reaction mixture of step 2 containing tri(2-methyl-4-pentenyl)borate, hydrogen bromide and a free radical catalyst.

9. The process of claim 8 wherein the reaction mixture of step 2 is maintained at temperatures ranging from about −10° C. to about 20° C. prior to washing and hydrolysis with an aqueous solution of base.

10. The process of claim 8 wherein, in step 4, the mixture comprises 3-methylnorcamphor and a strong base in a molar ratio of about 1:1 and wherein the aprotic solvent comprises from about 75% to about 95% by weight of the total mixture.

11. The process of claim 10 wherein, in step 4, the strong base is selected from the group consisting of sodium amide and sodium hydride.

12. The process of claim 10 wherein, in step 5, tri(2-methyl-5-bromopentyl)borate is reacted with the enolate of 3-methylnorcamphor in a molar ratio of the enolate of 3 - methylnorcamphor to tri(2 - methyl - 5-bromopentyl) borate of about 3:1.

References Cited

Chérest et al., Tetrahedron Letters, No. 8, pp. 875–879 (1966).

Morrison et al., "Organic Chemistry," pp. 135–136, 1962.

Noller, "Chemistry of Organic Compounds," 3rd edition, pp. 152–153, 1965.

Corey et al., Jour. Am. Chem. Soc., vol. 84, pp. 2611–2614 (1962).

LEON ZITVER, Primary Examiner

N. P. MORGENSTERN, Assistant Examiner

U.S. Cl. X.R.

252—462, 522, 587, 633; 260—117, 132